United States Patent
Tsai

(10) Patent No.: US 6,707,996 B2
(45) Date of Patent: Mar. 16, 2004

(54) CAMERA WITH A FOCUS RETAINING MECHANISM

(75) Inventor: Chen-Shuo Tsai, Tai-Chung Hsien (TW)

(73) Assignee: Primax Electronics Ltd., Taipei Hsien (TW)

( * ) Notice: Subject to any disclaimer, the term of this patent is extended or adjusted under 35 U.S.C. 154(b) by 148 days.

(21) Appl. No.: 10/063,308

(22) Filed: Apr. 10, 2002

(65) Prior Publication Data

US 2003/0091345 A1 May 15, 2003

(30) Foreign Application Priority Data

Nov. 15, 2001 (TW) .......................................... 90128373 A

(51) Int. Cl.[7] .............................. G03B 3/00; G03B 13/00
(52) U.S. Cl. ...................................... 396/144; 396/130
(58) Field of Search ................................. 396/130, 132, 396/144

(56) References Cited

U.S. PATENT DOCUMENTS 4,985,724 A * 1/1991 Akimoto et al. ............. 396/132
5,680,649 A * 10/1997 Akimoto et al. ............. 396/132

* cited by examiner

*Primary Examiner*—Russell Adams
*Assistant Examiner*—Arthur A Smith
(74) *Attorney, Agent, or Firm*—Winston Hsu

(57) ABSTRACT

A camera includes a base, a focusing lens, a retaining wheel, a pushing member, and a retaining hook. The base has a cylindrical and vertical opening in it. The focusing lens is rotationally fixed within the opening. The retaining wheel is rotationally fixed in the base. The horizontal sides of the retaining wheel include a ratchet side, a smooth side, a first end, and a second end positioned over the connecting portions of the ratchet side and the smooth side. The pushing member is horizontally and movably fixed in the base for moving the focusing lens and the retaining wheel. The retaining hook includes a horizontal arm and a vertical arm. The horizontal arm can move across the upper side of the retaining wheel, and the vertical arm can thus contact each of the horizontal sides of the retaining wheel.

10 Claims, 6 Drawing Sheets

CAMERA WITH A FOCUS RETAINING MECHANISM

BACKGROUND OF INVENTION

1. Field of the invention

The present invention relates to a focus retaining mechanism, and more particularly, to a focus retaining mechanism of a camera.

2. Description of the Prior Art

Please refer to FIG. 1. FIG. 1 is a top view of a lens driving device 10 of a camera according to the prior art. The lens driving device 10 is disclosed in U.S. Pat. No. 5,680,649 "LENS DRIVING DEVICE FOR AUTO-FOCUS CAMERA". The lens driving device 10 comprises a base 12 having a cylindrical and vertical opening 16, a focusing lens 14 rotatably fixed within the opening 16, a driving ring 40 rotatably fixed on the periphery of the opening 16 of the base 12, a shutter-driving ring 44 fixed on the base 12 by hooking the driving ring 40, a retaining member 42, a lens barrel 18 mounted on the base 12 by hooking the driving ring 40 and the retaining member 42, a first bi-directional driving motor 20 and a second bi-directional driving motor 30 fixed on the base 12, an elastic element 34 mounted on the base 12, and an electromagnetic valve 22 disposed on the base 12.

In addition, a cylindrical projection 46 disposed on the driving ring 40 engages with an engaging portion 19 of the lens barrel 18. Thus, when the driving ring 40 is rotated, the lens barrel 18 and the focusing lens 14 are also rotated. The second bi-directional driving motor 30 is used to rotate the shutter-driving ring 44 for controlling a shutter. The first bi-directional driving motor 20 is used to drive the electromagnetic valve 22 for mounting the retaining member 42 in a predetermined position so as to rotate the focusing lens 14 to a corresponding position. Moreover, an idler gear 70 and a first ratchet 50 are used for the transmission between the retaining member 42 and the electromagnetic valve 22.

As shown in FIG. 1, when the second bi-directional driving motor 30 rotates the a shutter-driving ring 44 toward a positive direction via a second ratchet 32 to control an opening position of the shutter, the shutter-driving ring 44 pushes the driving ring 40 to rotate the lens barrel 18 and focusing lens 14. At the same time, the driving ring 40 also moves the retaining member 42 so that a plurality of gear portions 43 engages with a hold lever 60 one by one. The retaining member 42 rotates the first ratchet 50 by engaging the idler gear 70.

When the second bi-directional driving motor 30 moves the shutter-driving ring 44 toward a positive direction to a predetermined position, which is an appropriate position for focusing, the first bi-directional driving motor 20 controls the electromagnetic valve 22 to stop rotating the first ratchet 50. At this time, a pull-back action to the retaining member 42, which is generated by the elastic element 34, is stopped due to the stop action of the electromagnetic valve 22. Thus, the lens barrel 18 and the shutter-driving ring 44 do not circumrotate so that the lens driving device 10 can focus and retain position. At this time, the shutter-driving ring 44 moves to a predetermined shutter position and opens the shutter, and the lens barrel 18 also drives the focusing lens 14 to rotate to a corresponding position.

The second bidirectional driving motor 30 continues to rotate in a positive direction and moves the shutter-driving ring 44 to an utmost position 45. At the same time, the first bi-directional driving motor 20 drives the electromagnetic valve 22 to rotate the first ratchet 50 so that the first ratchet 50 and the retaining member 42 rotate to corresponding utmost positions. At this time, the second bi-directional driving motor 30 provides no power to the lens driving device 10. That means after the second bi-directional driving motor 30 moves the shutter-driving ring 44 to utmost position 45, only the first bidirectional driving motor 20 provides a small amount of power to move focus retaining mechanisms such as the first ratchet 50, the retaining member 42, the lens barrel 18, the shutter-driving ring 44, and the elastic element 34 back to an initial state. After the first bi-directional driving motor 20 drives the electromagnetic valve 22 and the first ratchet 50 to their utmost positions, the first ratchet 50 does not contact with the electromagnetic valve 22, and a spring 62 disposed on the base 12 pulls the hold lever 60 back to the initial state. This is an action of closing the shutter. In addition, the elastic element 34 also pulls the retaining member 42 back to the initial state so that the shutter-driving ring 44, lens barrel 18, and the first ratchet 50 are also moved back to the initial states.

As described above, the prior lens driving device 10 has a complicated focus retaining mechanism, and an electromagnetic valve and a gear assembly are needed. Thus, the complexity and costs of components are increased. In addition, although the electromagnetic valve 22 acts effectively, the available space of the lens driving device 10 is decreased with the use of the electromagnetic valve 22.

SUMMARY OF THE INVENTION

It is therefore a primary objective of the claimed invention to provide a focus retaining mechanism of a camera with a simple design to solve the above-mentioned problem.

The claimed invention provides a focus retaining mechanism of a camera. The camera comprises a base, a focusing lens, a retaining wheel, a pushing member, and a retaining hook. The base has a cylindrical and vertical opening in it. The focusing lens is rotationally fixed within the opening. The retaining wheel is rotationally fixed in the base. The horizontal sides of the retaining wheel include a ratchet side, a smooth side, a first end, and a second end positioned over the connecting portions of the ratchet side and the smooth side. The pushing member is horizontally and movably fixed in the base for moving the focusing lens and the retaining wheel. The retaining hook includes a horizontal arm and a vertical arm. The horizontal arm can move across the upper side of the retaining wheel, and the vertical arm can thus contact each of the horizontal sides of the retaining wheel.

It is an advantage of the claimed invention that a focus retaining mechanism of a camera with a simple design is used for simplifying the focus retaining mechanism. These and other objectives of the present invention will no doubt become obvious to those of ordinary skill in the art after reading the following detailed description of the preferred embodiment, which is illustrated in the various figures and drawings.

DETAILED DESCRIPTION

Figure 1:
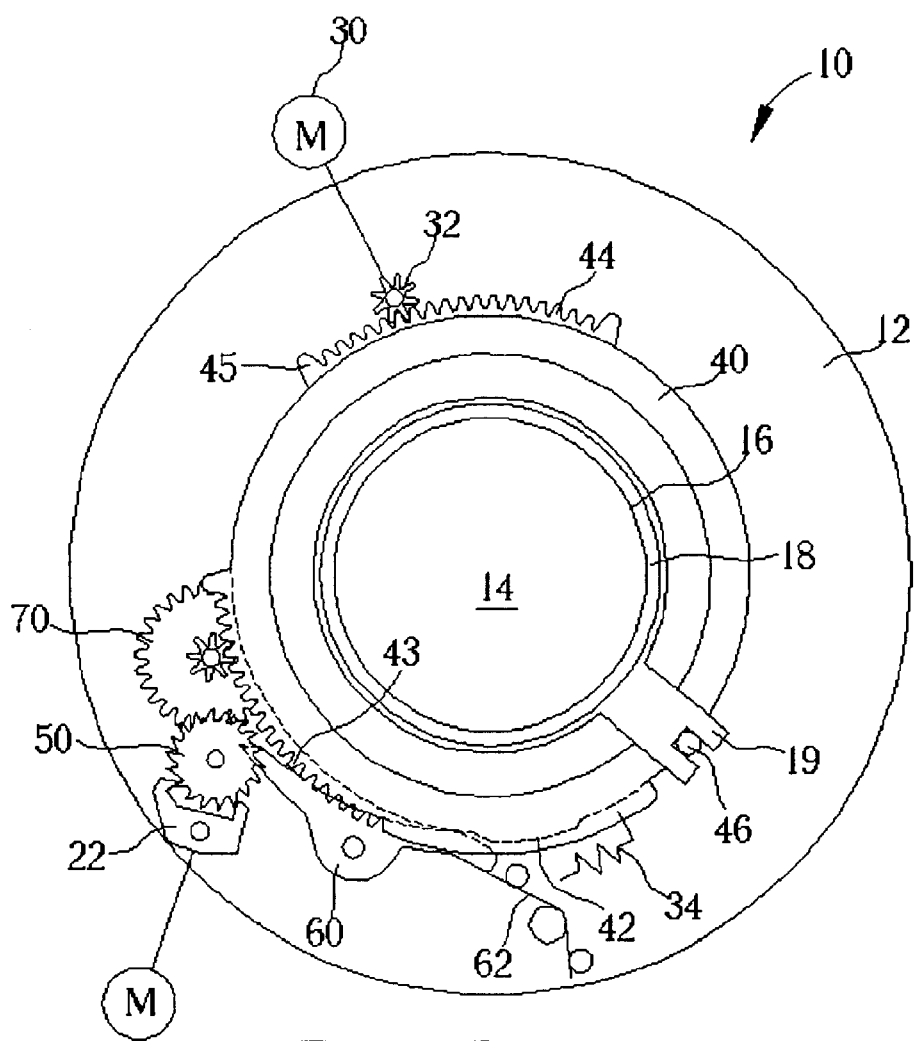
FIG. 1 is a top view of a lens driving device according to the prior art.
Figure 2:
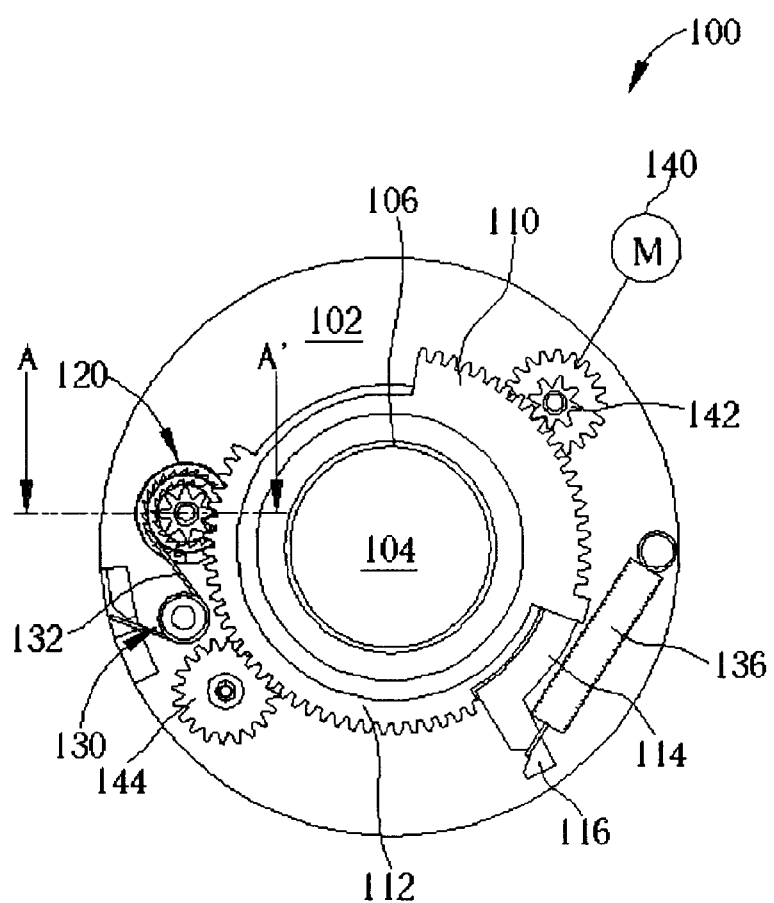
FIG. 2 is a simplified top view of a lens driving device according to the present invention.

In the present invention, mechanisms for moving a shutter and method thereof are the same as the prior art shown in FIG. 1. Please refer to FIG. 2 and FIG. 3. FIG. 2 is a simplified top view of a lens driving device 100 according to the present invention.

Figure 3:
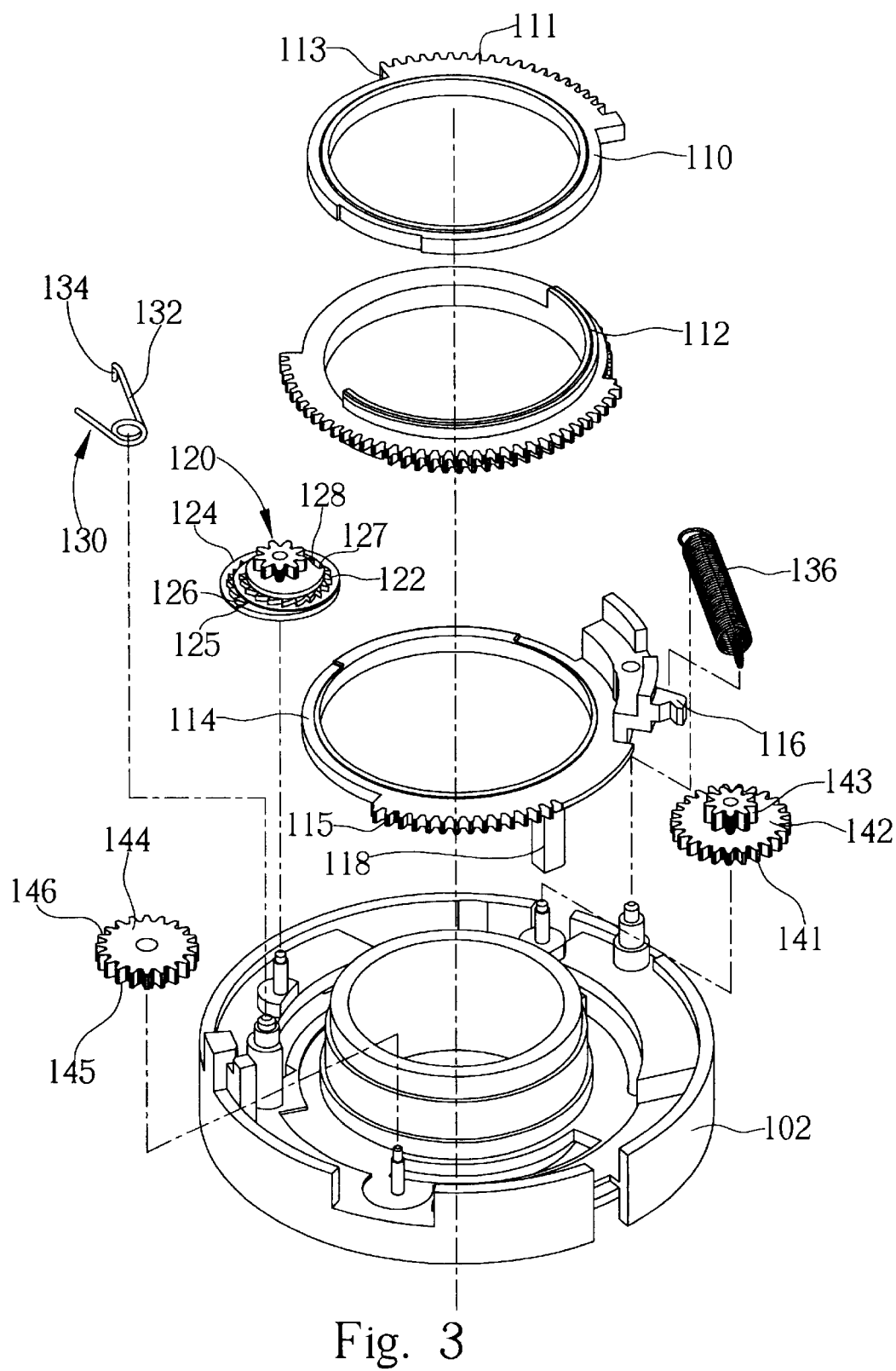
FIG. 3 is an exploded diagram of the lens driving device shown in FIG. 2.

FIG. 3 is an exploded diagram of the lens driving device 100 shown in FIG. 2.

As shown in FIG. 2 and FIG. 3, the lens driving device 100 comprises a base 102 comprising a cylindrical and vertical opening 106, a focusing lens 104 rotatably fixed within the opening 106, a driving ring 110 rotatably mounted on the periphery of the base 102, a retaining wheel 120 rotationally fixed on the base 102, a pushing member 112 horizontally and movably fixed on the base 102, a connecting ring 114 tightly engaged with the driving ring 110 and the pushing member 112 and rotatably fixed on the base 102, a retaining hook 130 mounted on the base 102, an elastic element 136 mounted on the base 102, a step motor 140 mounted on the base 102, and a first gear 142 and a second gear 144 mounted on the base 102 by engaging with the driving ring 110 and the pushing member 112 respectively.

The retaining hook 130 comprises a horizontal arm 132 movably mounted on the base 102 and a vertical arm 134 installed beneath the horizontal arm 132. The horizontal arm 132 and the vertical arm 134 are monolithically formed out of a flexible material such as metallic wire. The middle portion of the metallic wire is ring like and surrounds a shaft 103 on the base 102. Both ends of the metallic wire extended from the middle portion together form a "V" shape. The horizontal arm 132 and the vertical arm 134 are formed on one end. The other end props up the sidewall of the base 102. Thus, one end of the horizontal arm 132 is mounted on the shaft 103 so as to rotate flexibly.

The elastic element 136 is connected to a transmission lever 116 on the connecting ring 114 for mounting the connecting ring 114 flexibly so as to move and hook the driving ring 110 and the pushing mpmber 112. The driving ring 110 comprises a gear side 111 extruded to the ring-like edge for engaging with a top gear portion 143 of the first gear 142. The step motor 140 drives the first gear 142 to rotate via the bottom gear portion 141 pf the first gear 142. Since the top gear portion 143 of the first gear 142 has a smaller diameter than the bottom gear portion 141, the first gear 142 shrinks the rotating momentum of the related motion of the driving ring 110 to the step motor 140. The second gear 144 is an amplifying gear with an upside-down design of the first gear 142. The second gear 144 comprises a bottom gear portion 145 engaging with the gear side 115 of the connecting ring 114 and a top gear portion 146 engaging with the gear side 123 of the pushing member 112. The connecting ring 114 further comprises a lens connecting lever 118. When the step motor 140 drives the first gear 142 to rotate, a front end 113 of the gear side 111 of the driving ring 110 urges the lever 116 on the connecting ring 114 so that the connecting ring 114 urges the second gear 144 to rotate so is to move the pushing member 112. At the same time, the lexs connecting lever 118 on the connecting ring 114 moves th focusing lens 104 downward rotatably.

The retaining wheel 120 is a spiral gear 120 having an arc-shaped component with a ratchet side 122 in the horizontal direction on an outer side of the retaining wheel 120, a smooth side 124 with a sidewall of a first sliding groove 125 and a second sliding groove 127 on an inner side of the retaining wheel 120, and a first end 126 and a second end 128 disposed on two ends between the ratchet side 122 and the smooth side 124. The ratchet side 122 and the smooth side 124 of the retaining wheel 120 are both substantially circular peripheries, and the ratchet side 122 has a smaller radius than the smooth side 124 and is positioned above the smooth side 124. In addition, the horizontal arm 132 of the retaining hook 130 moves horizontally above the retaining wheel 120 so that the vertical end 134 beneath the horizontal arm 132 touches each horizontal side of the retaining wheel 120.

Figure 4:
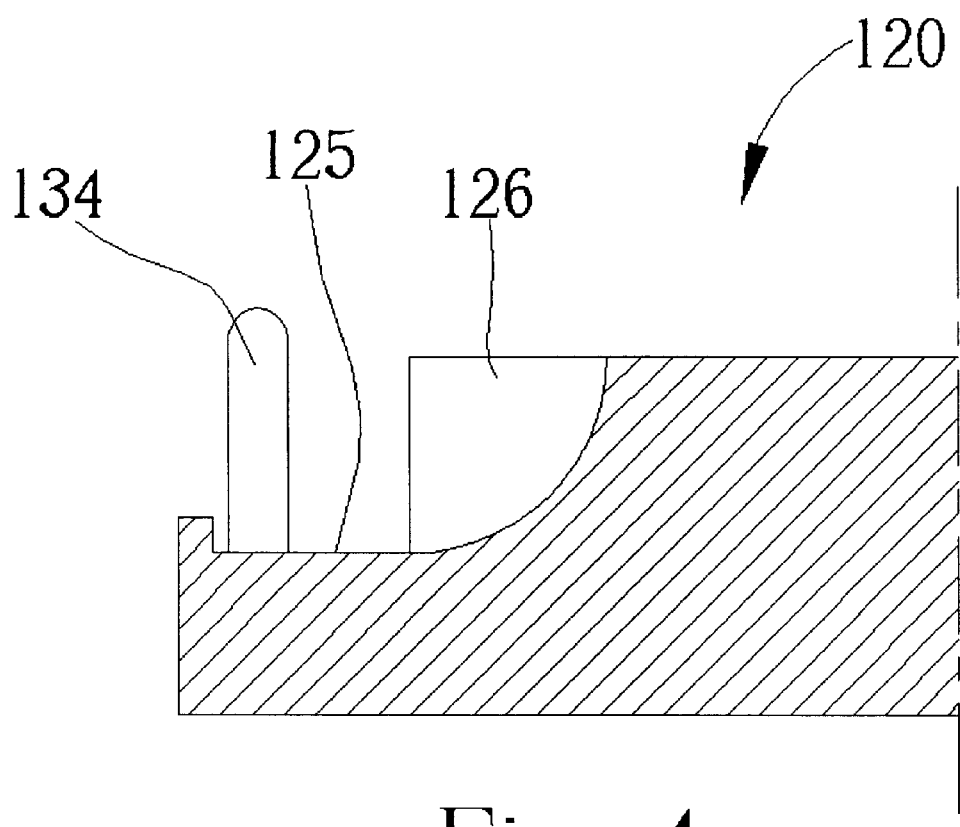
FIG. 4 is a cross-sectional view of a bottom portion of a retaining wheel of the lens driving device shown in FIG. 3.
Figure 5:
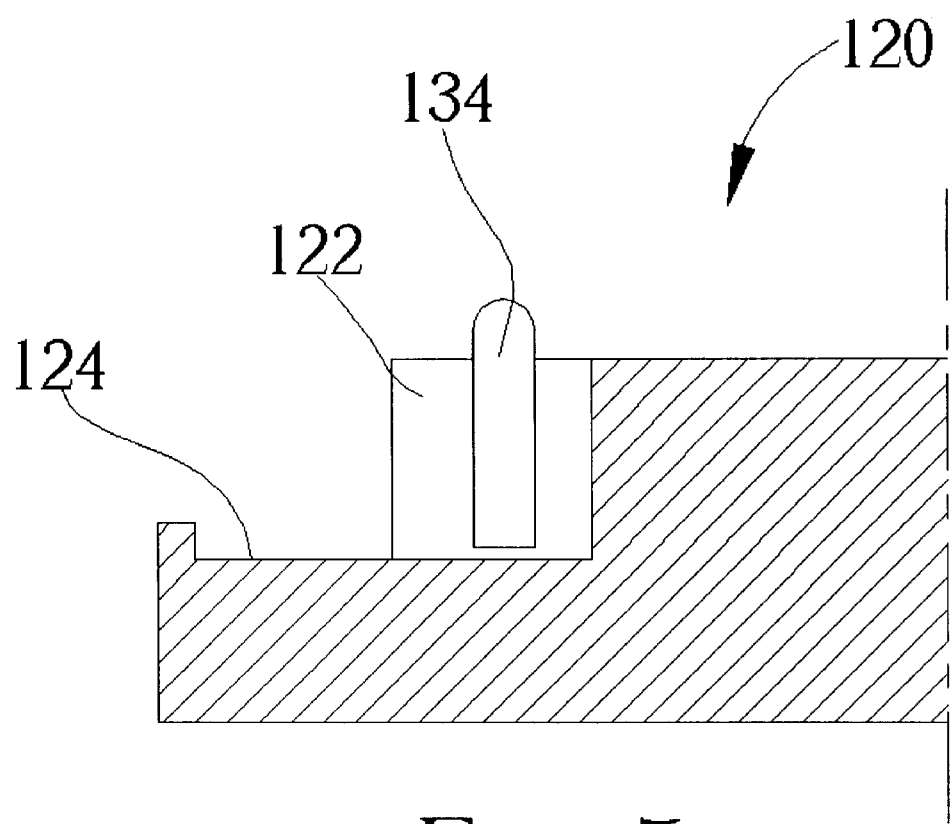
FIG. 5 is a partial cross-sectional view of the retaining wheel of the lens driving device shown in FIG. 3.
Figure 6:
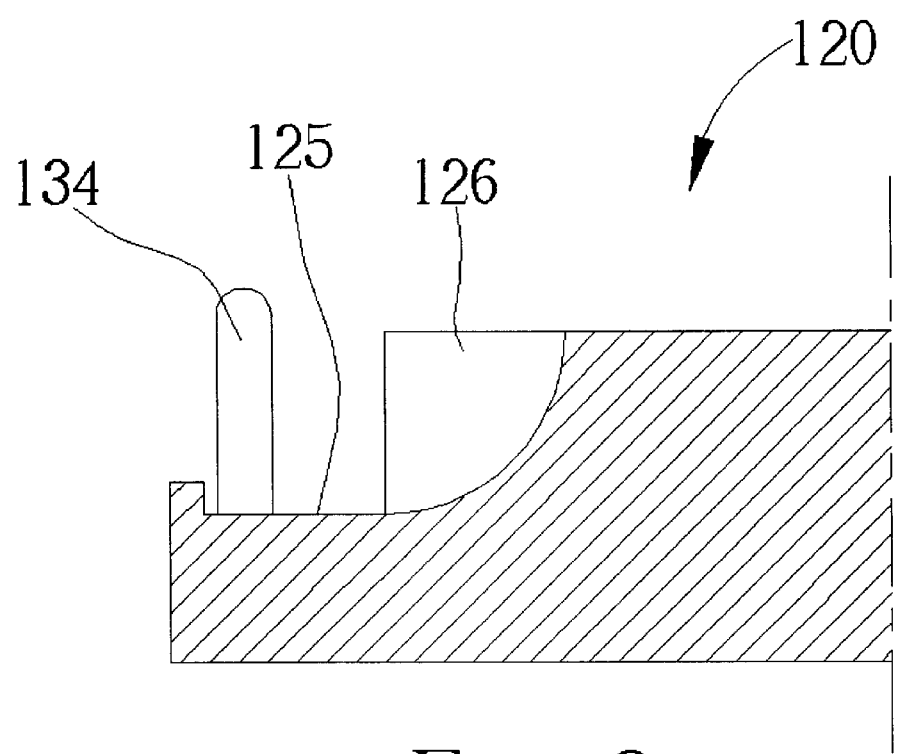
FIG. 6 is a cross-sectional view of a top portion of the retaining wheel of the lens driving device shown in FIG. 3.

Please refer to FIG. 4 to FIG. 6. FIG. 4 is a cross-sectional view of a bottom portion of the retaining wheel 120 of the lens driving device shown in FIG. 3 along a line A-A. FIG. 5 is a partial cross-sectional view of the retaining wheel 120 of the lens driving device shown in FIG. 3 along the line A—A. FIG. 6 is a cross-sectional view of a top portion of the retaining wheel 120 of the lens driving device shown in FIG. 3 along the line A—A. The first sliding groove 125 of the smooth side 124 of the retaining wheel 120 is used to guide a bottom end of the vertical arm 134 of the retaining hook 130. When vertical arm 134 of the retaining hook 130 passes through the first end 126 of the retaining wheel 120, the vertical arm 134 is guided upward to an initial end of the ratchet side 122 from a terminal end of the first sliding groove 125 of the smooth side 124. The initial end of the ratchet side 122 guides the vertical arm 134 upward along the smooth side 124 to the second end 128 of the retaining wheel 120. Moreover, the second sliding groove 127 on the second end 128 of the retaining wheel 120 is used to guide the bottom end of the vertical arm 134 downward to an initial end of the second sliding groove 127 of the smooth side 124 from a terminal end of the ratchet side 122.

As shown in FIG. 4 to FIG. 6, when the step motor 140 drives the driving ring 110 to rotate in a positive direction via the first gear 142, the driving ring 110 moves the connecting ring 114 so that the lens connecting lever 118 on the connecting ring 114 moves the focusing lens 104 downward rotatably along the opening 106. At the same time, the connecting ring 114 moves the pushing member 112 to rotate the retaining wheel 120 in the positive direction via the second gear 144. A pull-back force generated by the elastic element 136 acts on the transmission lever 116 on the connecting ring 114. The vertical arm 134 of the retaining hook 130 contacts the ratchet side 122 of the retaining wheel 120 at the first end 126 and slides along the ratchet side 122. When the step motor 140 moves the driving ring 110 in the positive direction to a predetermined position, which is a proper position for focusing, the step motor 140 stops in order to move the focusing lens 104 downward via the connecting ring 114. At the same time, the vertical arm 134 of the retaining hook 130 engages with the ratchet side 122 of the retaining wheel 120. Thus, the position of the pushing member 112 is fixed by the elastic force generated by the elastic element 136 in order to retain focus.

The ratchet side 122 comprises a plurality of ratchets. Each ratchet provides the focusing lens with a focusing position for satisfying the requirement of having different focusing positions. Since a number of the ratchets corresponds to a number of focusing levels, more focusing positions can be obtained by increasing a number of teeth in the first gear 142 and the second gear 144. Therefore, the focus control can be improved.

After the focusing lens 104 completes the action of focusing and retaining, the step motor 140 reverses. At this time, the pushing member 112 and the connecting ring 114 rmmain in the retained position, but the driving ring 110 is urged to rotate in an opposite direction so as to move a shutter switch using another end 113 of the gear side 111 to complete a photographing action.

After finishing the photographing action, the step motor 140 turns to rotate in the positive direction and moves the focusing lens 10 downward rotatably via the connecting ring 114. Finally, the vertical arm 134 of the retaining hook 130 leaves the ratchet side 122 of the retaining wheel 120, passes through the second end 128 of the retaining wheel 120 and slides toward the second sliding groove 127 of the smooth side 124 of the retaining wheel 120. At this time, the focus retaining mechanisms of the lens driving device 100 such as the driving ring 110, the pushing member 112, the retaining wheel 120, and the elastic element 136 already reach corresponding limiting positions. After that, the elastic element 136 pulls the connecting ring 114 so that the lens connecting lever 118 on the connecting ring 114 moves the focusing lens 104 upward rotatably along the opening 106 and the pushing member 112 is rotated in an opposite direction due to the transmission of the second gear 144. When the elastic element 136 pulls the connecting ring 114 and makes the pushing member 112 rotate reversibly, the step motor 140 also rotates reversibly so as to prevent generating a reverse rotating force on the pushing member 112. At this time, the vertical arm 134 of the retaining hook 130 slides downward along the sidewall of the second sliding groove 127 on the smooth side 124 of the retaining wheel 120 until passing through the first end 126 of the retaining wheel 120 to the initial state. In the same manner, the focus retaining mechanisms of the lens driving device 100 such as the driving ring 110, the pushing member 112, the retaining wheel 120, and the elastic element 136 also move back to their initial positions. Thus, a focus retaining process of the lens driving device of the camera 100 is completed.

In contrast with the prior art, the lens driving device 100 in the present invention is obviously different from the prior lens driving device 10. The focus retaining mechanisms of the lens driving devices 100 only uses the retaining hook 130 and the retaining wheel 120, which are designed simply, for retaining without adding any other electric device or gear sets. Thus, more space is available inside the lens driving device of the camera, and the manufacturing cost is also reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A camera comprising:

a base having a cylindrical and vertical opening;

a focusing lens rotationally fixed within the opening, the focusing lens moving up and down along the opening when rotating the focusing lens;

a retaining wheel rotationally fixed in the base, horizontal sides of the retaining wheel including a ratchet side and a smooth side, the retaining wheel having a first end and a second end positioned over connecting portions of the ratchet side and the smooth side;

a pushing member horizontally and movably fixed in the base for moving the focusing lens and the retaining wheel; and a retaining hook having a horizontal arm movably fixed on the base and a vertical arm installed under the horizontal arm;

wherein when the pushing member drives the focusing lens to move downward and drives the retaining wheel to rotate in a positive direction, the vertical arm of the retaining hook will slide along the ratchet side of the retaining wheel from the first end of the retaining wheel.

2. The camera of claim 1 wherein the ratchet side and the smooth side of the retaining wheel are both substantially circular peripheries, the ratchet side having a greater radius than the smooth side and being positioned above the smooth side, the first end of the retaining wheel having a first sliding groove for guiding a bottom end of the vertical arm of the retaining hook upward to an initial end of the ratchet side from a terminal end of the smooth side, the second end of the retaining wheel having a second sliding groove for guiding the bottom end of the vertical arm of the retaining hook downward to an initial end of the smooth side from a terminal end of the ratchet side.

3. The camera of claim 1 wherein the retaining wheel comprises an arc-shaped element having an inner arc side and an outer arc side, the ratchet side and the smooth side of the retaining wheel being positioned at the arc sides of the arc-shaped element.

4. The camera of claim 3 wherein the arc-shaped element of the retaining wheel has a spiral shape.

5. The camera of claim 3 wherein the ratchet side of the retaining wheel is positioned at the outer arc side of the arc-shaped element, the smooth side of the retaining wheel being positioned at the inner arc side of the arc-shaped element.

6. The camera of claim 3 wherein the horizontal arm is capable of moving horizontally above the arc-shaped element of the retaining wheel so that the vertical arm is capable of contacting the arc sides of the arc-shaped element.

7. The camera of claim 1 wherein the horizontal arm and the vertical arm of the retaining hook are monolithically formed with an elastic metal wire.

8. The camera of claim 1 further comprising:

an elastic element fixed on the base for elastically fixing the pushing member;

a step motor fixed on the base for pushing the pushing member so as to drive the focusing lens and the retaining wheel;

wherein when the step motor uses the pushing member to drive the focusing lens to move downward and to drive the retaining wheel to rotate in the positive direction, the vertical arm of the retaining hook will slide along the ratchet side of the retaining wheel from the first end of the retaining wheel.

9. The camera of claim 8 further comprising a driving ring movably fixed on the base wherein the step motor uses the driving ring to drive the pushing member.

10. The camera of claim 9 wherein the driving ring is rotatably fixed on the base along the opening of the base.

* * * * *